(12) United States Patent
Oswald et al.

(10) Patent No.: US 10,926,678 B2
(45) Date of Patent: Feb. 23, 2021

(54) HEADREST SPEAKERS WITH ASYMMETRIC RADIATION PATTERNS

(71) Applicant: Bose Corporation, Framingham, MA (US)

(72) Inventors: Charles Oswald, Salem, NY (US); Muhammad Haris Usmani, Dover, MA (US); Tobe Z. Barksdale, Bolton, MA (US)

(73) Assignee: Bose Corporation, Framingham, MA (US)

( * ) Notice: Subject to any disclaimer, the term of this patent is extended or adjusted under 35 U.S.C. 154(b) by 436 days.

(21) Appl. No.: 15/850,670

(22) Filed: Dec. 21, 2017

(65) Prior Publication Data

US 2019/0193612 A1 Jun. 27, 2019

(51) Int. Cl.
| | |
|---|---|
| *B60N 2/58* | (2006.01) |
| *H04R 1/28* | (2006.01) |
| *H04R 1/02* | (2006.01) |
| *B60R 11/02* | (2006.01) |
| *H04R 1/32* | (2006.01) |
| *B60N 2/879* | (2018.01) |

(52) U.S. Cl.
CPC .............. *B60N 2/58* (2013.01); *B60N 2/879* (2018.02); *B60R 11/0217* (2013.01); *H04R 1/025* (2013.01); *H04R 1/2803* (2013.01); *H04R 1/323* (2013.01)

(58) Field of Classification Search
CPC ....... B60N 2/879; B60N 2/58; B60R 11/0217; H04R 1/025; H04R 1/2803; H04R 1/323

USPC .......................................................... 181/150
See application file for complete search history.

(56) References Cited

U.S. PATENT DOCUMENTS

| | | | | |
|---|---|---|---|---|
| 4,042,791 A | * | 8/1977 | Wiseman | H04R 5/023 381/109 |
| 5,887,071 A | * | 3/1999 | House | H04R 5/02 381/332 |
| 5,949,894 A | * | 9/1999 | Nelson | H04S 1/002 381/17 |
| 6,744,898 B1 | * | 6/2004 | Hirano | H04R 5/023 381/333 |
| 7,684,577 B2 | * | 3/2010 | Arai | A47C 7/72 381/302 |

(Continued)

FOREIGN PATENT DOCUMENTS

DE 102009021673 A1 * 11/2010 ............. B60N 2/879

*Primary Examiner* — Jeremy A Luks
(74) *Attorney, Agent, or Firm* — Fish & Richardson P.C.

(57) ABSTRACT

The technology described in this document can be embodied in a headrest for a vehicle-seat, the headrest including a first acoustic assembly and a second acoustic assembly. The first acoustic assembly includes a first set of one or more acoustic transducers, and is configured to radiate acoustic energy from a first portion of the headrest in a first radiation pattern. The second acoustic assembly includes a second set of one or more acoustic transducers, and is configured to radiate acoustic energy from a second portion of the headrest in a second radiation pattern. The first acoustic assembly and the second acoustic assembly are configured such that the first radiation pattern and the second radiation pattern are substantially different from one another, and generate an asymmetric radiation pattern for the headrest.

18 Claims, 8 Drawing Sheets

(56) References Cited

U.S. PATENT DOCUMENTS

| | | | | |
|---|---|---|---|---|
| 8,483,413 B2* | 7/2013 | Hartung | ............... | H04R 5/02 |
| | | | | 381/302 |
| 9,403,454 B2* | 8/2016 | Subat | ............... | B60R 11/0217 |
| 9,440,566 B2* | 9/2016 | Subat | ............... | H04R 5/023 |
| 10,457,179 B1* | 10/2019 | Kentley-Klay | ........ | B60N 2/879 |
| 2008/0273724 A1* | 11/2008 | Hartung | ............... | H04S 7/302 |
| | | | | 381/302 |
| 2014/0270322 A1* | 9/2014 | Silverstein | ............ | H04R 1/023 |
| | | | | 381/391 |
| 2015/0201260 A1* | 7/2015 | Oswald | ............... | H04R 1/025 |
| | | | | 381/86 |
| 2016/0039320 A1* | 2/2016 | Subat | ............... | H04R 1/025 |
| | | | | 297/217.5 |

* cited by examiner

HEADREST SPEAKERS WITH ASYMMETRIC RADIATION PATTERNS

TECHNICAL FIELD

This disclosure generally relates to seats that include acoustic output devices such as speakers.

BACKGROUND

Headrests used in vehicle seats can include speakers to deliver a near-field acoustic experience.

SUMMARY

In one aspect, this document features a system that includes a headrest for a vehicle-seat, the headrest including a first acoustic assembly and a second acoustic assembly. The first acoustic assembly includes a first set of one or more acoustic transducers, and is configured to radiate acoustic energy from a first portion of the headrest in a first radiation pattern. The second acoustic assembly includes a second set of one or more acoustic transducers, and is configured to radiate acoustic energy from a second portion of the headrest in a second radiation pattern. The first acoustic assembly and the second acoustic assembly are configured such that the first radiation pattern and the second radiation pattern are substantially different from one another, and generate an asymmetric radiation pattern for the headrest.

In another aspect, this document features a vehicle seat that includes a seat headrest, a first acoustic assembly, and a second acoustic assembly. The seat headrest is configured to support the head of an occupant of the vehicle seat. The first acoustic assembly is disposed in the seat headrest such that a first set of one or more acoustic transducers of the first acoustic assembly is configured to radiate acoustic energy from a first portion of the headrest in a first radiation pattern. The second acoustic assembly is disposed in the seat headrest such that a second set of one or more acoustic transducers of the second acoustic assembly is configured to radiate acoustic energy from a second portion of the headrest in a second radiation pattern. The first acoustic assembly and the second acoustic assembly are configured such that the first radiation pattern and the second radiation pattern are substantially different from one another, and generate an asymmetric radiation pattern.

Implementations of the above aspects can include one or more of the following features.

The first portion of the headrest can include a first side of the headrest, and the second portion of the headrest can include another, substantially opposite second side of the headrest. The second portion of the headrest can be closer to an adjacent location of a vehicle occupant as compared to the first portion of the headrest. The one or more acoustic transducers of the first acoustic assembly can be oriented differently from the one or more acoustic transducers of the second acoustic assembly to generate the asymmetric radiation pattern. An acoustic channel can be disposed between the second set of one or more acoustic transducers and an external opening disposed on the second portion of the headrest. The acoustic channel can be configured such that the second set of one or more acoustic transducers radiates acoustic energy through the acoustic channel in accordance with the second radiation pattern. The acoustic channel can include an acoustic guide configured to direct acoustic energy out of the acoustic channel in accordance with the second radiation pattern, the acoustic guide being configured to be removably attached to the acoustic channel. The acoustic channel can be configured such that acoustic energy radiated by the second set of one or more acoustic transducers is directed preferentially towards the front of the headrest. An acoustic channel can be disposed between the first set of one or more acoustic transducers and a corresponding external opening disposed on the first portion of the headrest can be configured such that acoustic energy radiated by the first set of one or more acoustic transducers is directed preferentially towards the side of the headrest. The second radiation pattern can represent a target inter-seat distribution characteristic. The second radiation pattern can represent a target inter-aural distribution characteristic.

Various implementations described herein may provide one or more of the following advantages. By configuring acoustic channels on the two sides of a headrest to radiate asymmetrically, inter-seat isolation may be improved. For example, the acoustic channel closer to another seat in the vehicle may be configured to radiate away from the other seat, and differently from the acoustic channel closer to the periphery of the vehicle cabin. This in turn may improve inter-seat acoustic isolation. In some cases, such asymmetric radiation may improve user-experience, for example, for frequencies above which (e.g., 4 KHz or more) acoustic signals typically become directional. By providing a detachable component that may be inserted into an acoustic channel of a headrest to affect the radiation pattern of the acoustic channel, the technology can be made compatible with pre-manufactured headrests. In some cases, the asymmetric radiating patterns are obtained without any significant degradation in inter-aural characteristics such as inter-aural level difference or inter-aural phase difference.

Two or more of the features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

DETAILED DESCRIPTION

This document describes technology for configuring acoustic radiation patterns associated with transducers disposed in vehicle seats. For example, the technology described herein may be used for adjusting the radiation pattern emanated from a transducer disposed in a seat such that the radiation pattern does not significantly interfere with an acoustic experience of an occupant of an adjacent seat. Therefore, in some cases, the technology may improve inter-seat acoustic isolation between acoustic outputs of speakers in two different seats. This in turn may result in improvements in near-field acoustic experience provided by near-field acoustic transducers disposed in portions of a vehicle seat. This document primarily uses examples of vehicle seat headrests to illustrate the technology. However, the technology may be applicable to other types of acoustically enabled seats or furniture that may have speakers installed in the manner described herein. For example, the technology can be used in massage chairs, sofas, recliners, tables, gaming chairs, theater seats, or beds fitted with speakers.

Figure 1:
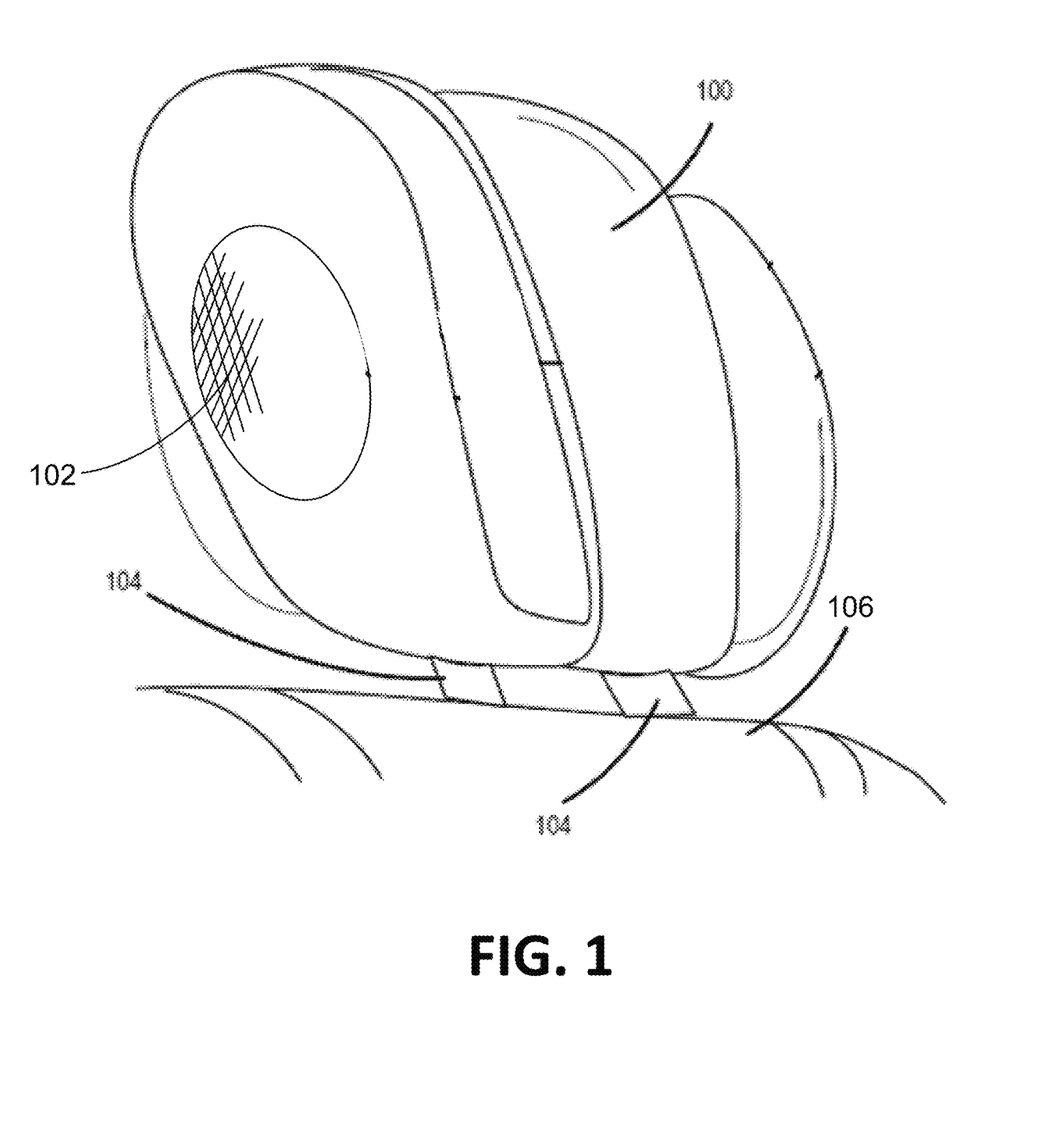
FIG. 1 is a perspective view of a headrest with acoustic channels that radiate out of the two sides of the headrest.

Vehicle seats (e.g., seats used in cars, trucks, buses, trains, aircrafts, boats, or other vehicles) can be fitted with acoustic transducers or speakers for delivering a near-field acoustic experience. In some cases, speakers are fitted into seats such that the speakers are proximate to the ears of an occupant of the seat, to provide an immersive, and potentially personalized acoustic experience. In some cases, multiple speakers may be disposed. In some cases, one or more speakers are disposed within a headrest of a seat such that the speakers radiate acoustic energy out of the two sides of the headrest. FIG. 1 illustrates an example of a headrest 100 that incorporates acoustic transducers or speakers. The speakers can be disposed within a housing of the headrest, and positioned such that the speakers are directly behind the user's head and fire outwardly, in diverging directions on either side of the headrest 100. The headrest 100 can be connected to the seat backrest 106 via one or more connecting rods 104. In some cases, the acoustic output from the speakers can be radiated out of the headrest 100 through an acoustic channel having an opening 102 disposed on an outer face of the headrest (or headrest wing).

Figure 2:
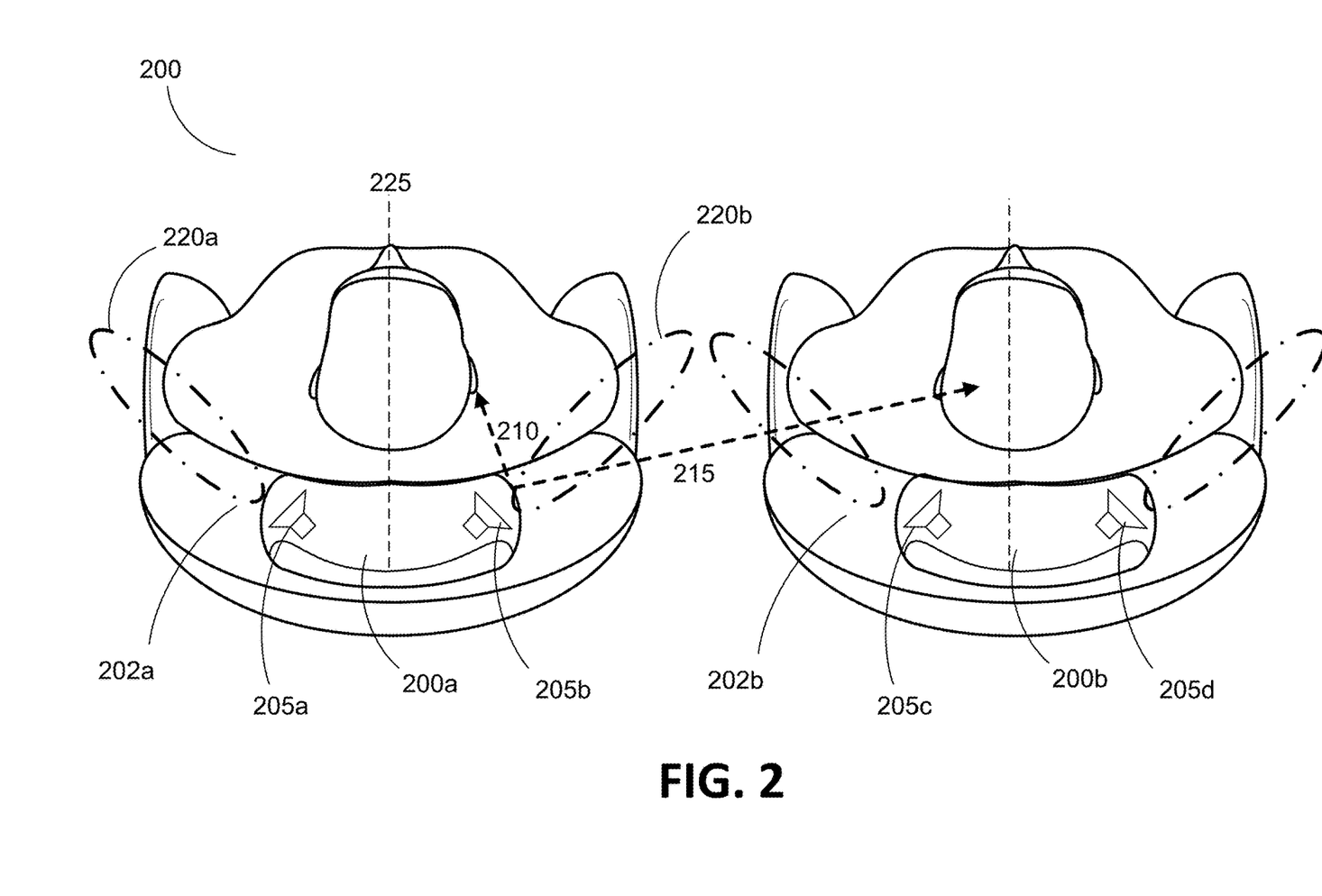
FIG. 2 is a top view of two adjacent vehicle seats with headrest speakers in each.

For two vehicle seats disposed adjacent to one another (e.g., the two front seats in a car), a first side of a headrest of a seat is closer to the other seat as compared to the second side. FIG. 2 shows an example of such a configuration 200, in which a seat 202a is adjacent to another seat 202b. The seats 202a and 202b (202, in general) include headrests 200a and 200b, respectively, each having acoustic transducers radiating acoustic energy through the respective sides of the headrests 200a and 200b. For example, the headrest 200a includes the acoustic transducers 205a and 205b for radiating acoustic energy out of the respective sides of the headrest 200a, and the headrest 200b includes the acoustic transducers 205c and 205d for radiating acoustic energy out of the respective sides of the headrest 200b. The acoustic transducers 205a and 205b may be referred to as the outboard transducer and inboard transducer, respectively, of the headrest 200a, and the acoustic transducers 205c and 205d may be referred to as the inboard transducer and outboard transducer, respectively, of the headrest 200b.

In some cases, the acoustic output of an inboard acoustic transducer of one seat may interfere with the near-field acoustic experience of an occupant of the other seat. This can happen, for example, when the acoustic radiation pattern 220a associated with the outboard acoustic transducer 205a is substantially similar to the acoustic radiation pattern 220b associated with the inboard acoustic transducer 205b. In such cases, the overall radiation pattern of the headrest can be referred to as being symmetric with respect to the center line 225 of the headrest 200a. For a symmetric radiation pattern, as shown in FIG. 2, in addition to radiating acoustic energy in a desired direction 210 towards an occupant of the seat 202a, the inboard acoustic transducer 205b may also radiate acoustic energy in an undesired direction 215 towards the occupant of the seat 202b. The acoustic energy radiated along the direction 215 may be referred to as leakage, which may interfere with the near-field acoustic experience generated by the acoustic transducers 205c and 205d for an occupant of the seat 202b. Any leakage may be tolerable if the desired signal (e.g., the signal from the inboard transducer 205b along the direction 210) is higher in magnitude than the undesired signal (e.g., the signal from the inboard acoustic transducer 205c of the other seat in this example) in the frequency range typically output by the transducers (e.g., up to about 10 KHz). However, in some cases where the transducers disposed within seat headrests are angled to the side (e.g., to address pinna shading challenges associated with an occupant of the respective seat), the leakage at some frequencies may be larger in magnitude than the desired signal at the corresponding frequencies. This may be more pronounced in higher frequencies (e.g., 4 KHz and above) due to the inherent directionality of signals at such frequencies. One way to reduce leakage would be to suppress signals in the high frequency range (e.g., 4-10 KHz), for example, using a band-pass filter having a stop band in the 4-10 KHz range. However, such band-passing may interfere with the acoustic quality of the transducer outputs. The technology described in this document may allow for reducing leakage from a near-field acoustic transducer disposed in an adjacent seat, even when the transducer is configured to output directional signals at high frequencies.

Figure 3:
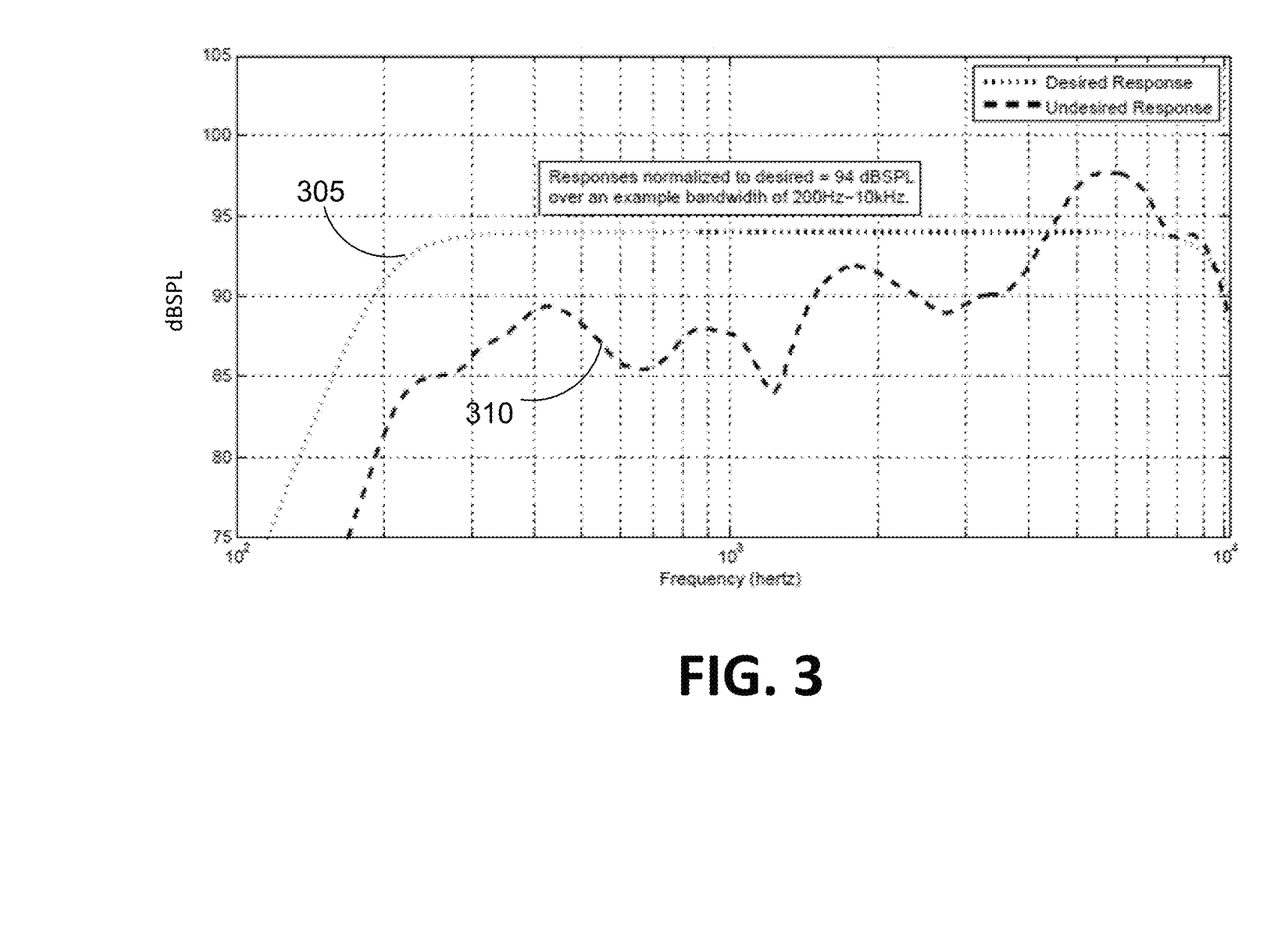
FIG. 3 is a plot showing responses of a speaker disposed in a vehicle headrest.

FIG. 3 is a plot showing normalized responses for a speaker disposed on one side of a vehicle headrest. FIG. 3 includes the desired response (i.e. the output measured as a decibel sound pressure level ($dB_{SPL}$) at the location of a user's ear on the inboard side) 305 of the speaker in the presence of undesired response or leakage 310 (at the same location) from the speaker of the inboard side of the headrest of an adjacent seat. Comparing the responses 305 and 310, it can be observed that while the undesired response 310 is lower than the desired response 305 for frequencies up to about 2 KHz, the former starts increasing at higher frequencies, and exceeds the latter at frequencies of about 3.5-6.5 KHz.

In some implementations, the inter-seat isolation may be improved by configuring an acoustic channel on the inboard side to radiate acoustic energy away from the direction of the occupant of the adjacent seat. For example, the inboard acoustic channel can be configured to generate a radiation pattern in which the acoustic energy emanating from the channel is radiated preferentially towards the front of the vehicle cabin rather than towards the occupant of the other seat. In some cases, this may improve inter-seat isolation for higher frequencies that otherwise may degrade the near-field acoustic experience for an occupant of the adjacent seat.

Figure 4A:
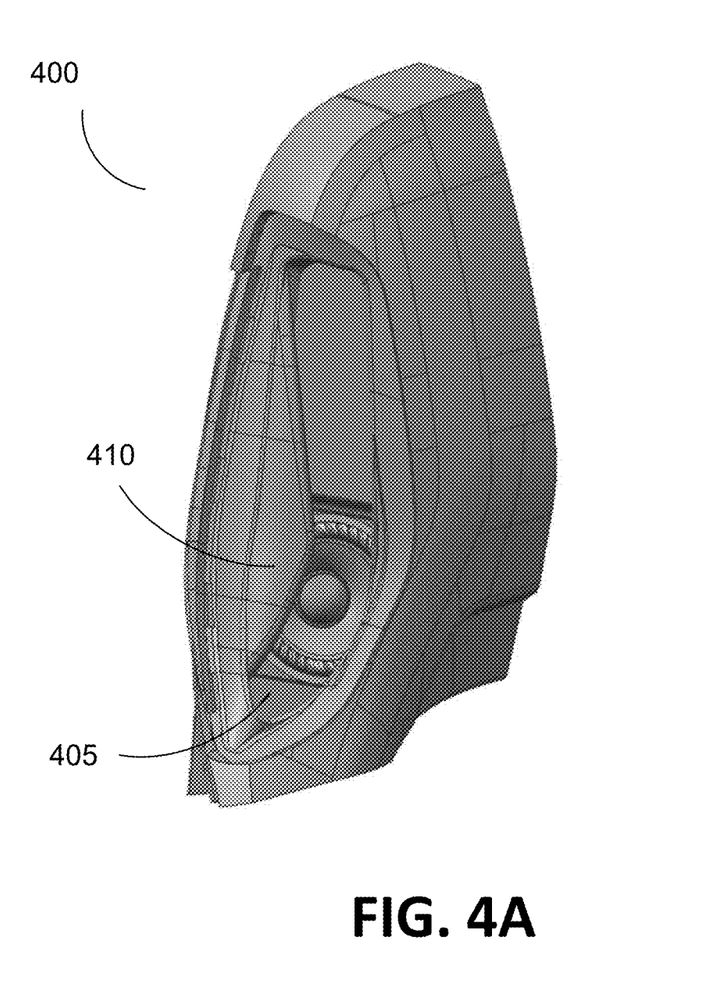
FIGS. 4A and 4B are external and internal perspective views, respectively of an external opening of an acoustic channel of a headrest in accordance with the technology described herein.
Figure 4B:
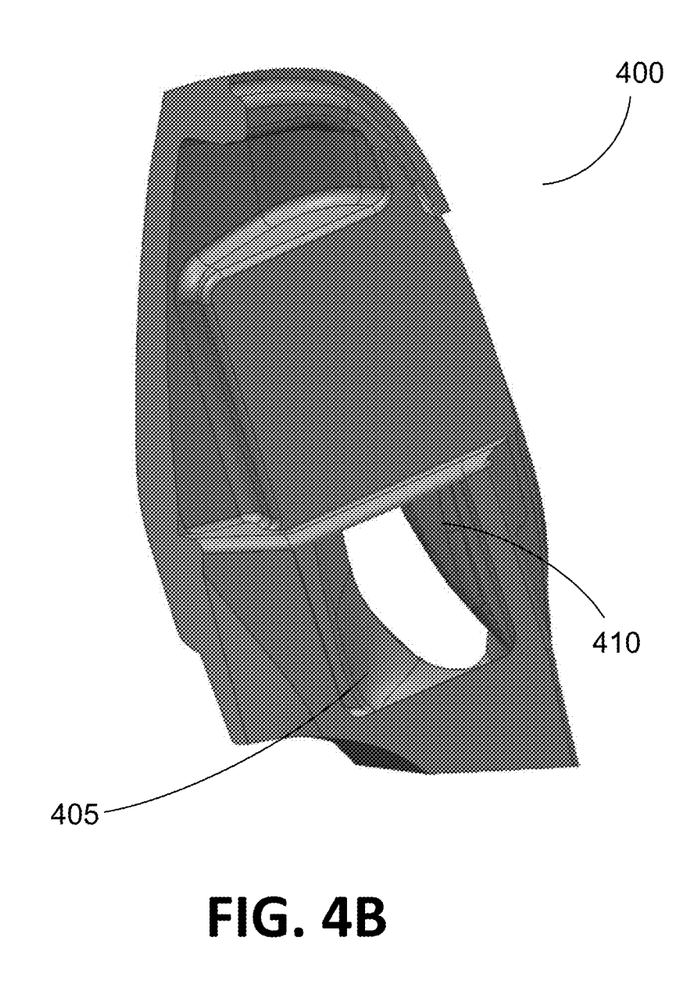

FIGS. 4A and 4B are external and internal perspective views, respectively, of an external opening of a headrest 400. Specifically, FIG. 4A shows a portion of the headrest 400 viewed from outside of the headrest, and FIG. 4B shows substantially the same portion viewed from the inside of the headrest. Even though only one side of the headrest 400 is shown in each of FIGS. 4A and 4B, the opposite side of the headrest may include another external opening corresponding to the acoustic channel on the other side. The headrest 400 can include separate acoustic assemblies for radiating acoustic energy from the two sides. For example, the headrest can include a first acoustic assembly and a second acoustic assembly, each of which includes a first set of one or more acoustic transducers such as the speaker used for producing the plot shown in FIG. 3. The acoustic assembly on each side can also include an acoustic channel disposed to radiate acoustic energy generated by the corresponding acoustic transducers out of the headrest through a corresponding external opening.

In some implementations, the acoustic assemblies on the two sides of the headrest can be configured differently such that the radiation pattern in which acoustic energy is radiated from one side is substantially different from the radiation pattern in which acoustic energy is radiated from the other side. The two radiation patterns together may generate an asymmetric radiation pattern for the headrest, which in some cases, may improve inter-seat isolation. For example, the acoustic assembly on the inboard side may be configured to radiate acoustic energy towards the front of the vehicle cabin (e.g., in a direction away from the adjacent seat), while the acoustic assembly on the outboard side is configured to radiate acoustic energy towards the side such that, for example, the acoustic energy radiated from the outboard side of the headrest is reflected off the side of cabin towards an occupant of the seat. By using technology described herein such asymmetric radiation pattern may be obtained with insignificant degradations in inter-aural characteristics such as inter-aural level difference (ILD) and/or inter-aural phase difference (IPD). For example, in some cases, by configuring only the acoustic assembly on the inboard side, an improvement in the worst-case inter-seat isolation may be achieved (as compared to the case where both the inboard and outboard sides radiate substantially identical radiation patterns), with insignificant degradations in inter-aural characteristics.

In some implementations, the asymmetric radiation pattern can be obtained by configuring a portion of an acoustic channel on the inboard side. For example, as shown in FIGS. 4A and 4B, an inboard side acoustic channel 405 can include a shaping portion 410 that is disposed in a portion of the acoustic channel 405 towards the back of the headrest 400. The shaping portion 410 shapes the radiation pattern emanating from the corresponding acoustic assembly such that the acoustic energy is radiated in a direction away from the location of an occupant of an adjacent seat. For example, when the shaping portion 410 is located towards the back of the headrest (as shown in FIGS. 4A and 4B), the acoustic energy coming out through the acoustic channel 405 may be directed towards the front of the headrest 400 (e.g., towards an occupant of the corresponding seat, or the front of the vehicle cabin). The shape and size of the shaping portion 410 can be configured in accordance with the target radiation pattern, for example, experimentally. The shaping portion 410 can be configured to have a substantially smooth surface to prevent undesirable reflections and/or absorption of acoustic energy.

Figure 4C:
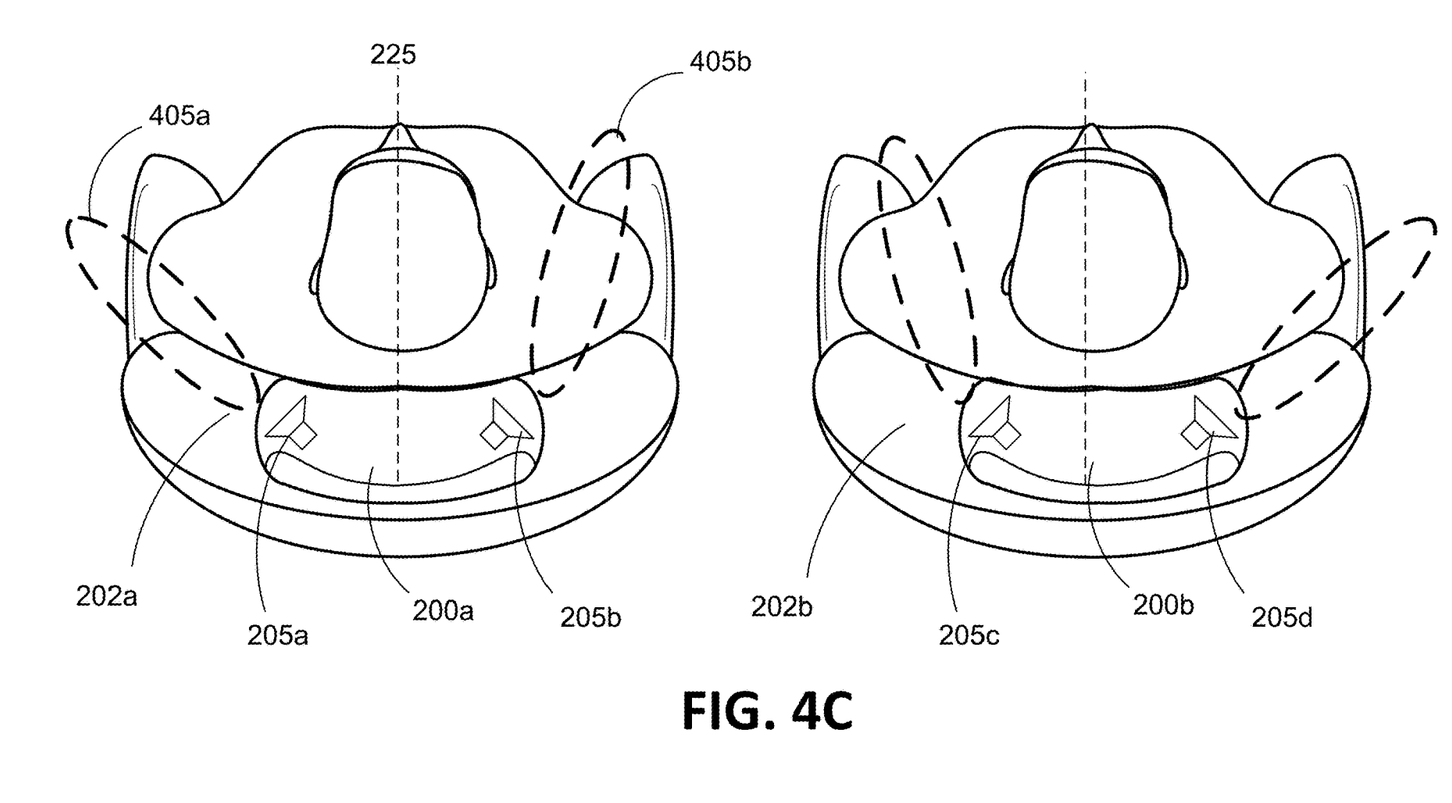
FIG. 4C is a top view of two adjacent vehicle seats with headrest speakers having an asymmetric radiation pattern.

An example of an asymmetric radiation patterns is illustrated in FIG. 4C. In this example, the acoustic radiation pattern 405a associated with the outboard acoustic transducer 205a is substantially different from the acoustic radiation pattern 405b associated with the inboard acoustic transducer 205b. Specifically, in this example, the radiation pattern 405b is directed preferentially towards the front of the headrest 200a, as compared to the radiation pattern 405a, which is directed preferentially towards the side of the headrest. As a result, the overall radiation pattern of the headrest in the example of FIG. 4C is asymmetric with respect to the center line 225 of the headrest 200a.

The asymmetry of the radiation pattern can be achieved in various ways. In some implementations, the asymmetry may be achieved by configuring the angle of the radiation patterns of the two sides differently, as shown in the example of FIG. 4C. In some implementations, differences in other attributes of the radiation patterns (e.g., power and/or directionality of the corresponding acoustic transducers, number of acoustic transducers on each side, etc.) can also result in the radiation patterns on the two sides being substantially different from one another, thereby resulting in a substantially asymmetric radiation pattern.

In some implementations, the shaping portion 410 may be an integral portion of the acoustic channel, and may be constructed from material used for the acoustic channel. For example, the shaping portion 410 can be constructed using a rigid but lightweight material such as expanded (or injection-molded) resin. Other materials that may be used for constructing the shaping portion 410 include, for example, thermoplastic material such as polystyrene, polypropylene, polyethylene, and acrylonitrile butadiene styrene (ABS). In some implementations, rigid, closed-cell resin foam such as expanded polystyrene (EPS) may be used due to desirable acoustic isolation properties. In some cases, the acoustic isolation afforded by EPS can be beneficial, for example, in achieving acoustic isolation between the two acoustic assemblies of the headrest 400.

In some implementations, the radiation pattern of an acoustic channel can also be configured using an acoustic guide that can be inserted into the acoustic channel of a headrest. In some cases, such an attachable acoustic guide may be used in improving inter-seat isolation. For example, the acoustic guide can be configured to reduce a cross-sectional area of the opening through which acoustic energy is radiated out and/or positioned to configure the radiation pattern. In some implementations, the attachable acoustic guide is positioned towards the back of the headrest such that the resulting radiation pattern is preferentially skewed towards the front of the headrest. In some implementations, the size and shape of the acoustic guide may be configured based on target radiation patterns (e.g., experimentally) corresponding to the acoustic transducers in the acoustic assembly.

The asymmetric radiation patterns between the acoustic assemblies on the two opposing sides of a headrest can be obtained in various other ways. In some implementations, the asymmetric radiation patterns can be obtained using different orientations of the acoustic transducers in the acoustic assemblies on the two opposing sides. For example, one or more acoustic transducers on the inboard side may be oriented more towards the occupant of the seat as compared to the corresponding transducers on the outboard side. In some implementations, the asymmetric radiation patterns can be obtained using different acoustic transducers in the acoustic assemblies on the two opposing sides. For example, high frequency (and hence possibly more directional) acoustic transducers (e.g., speakers supporting frequencies in the 4-10 KHz range) may be disposed in the acoustic assembly on the outboard side, while lower frequency acoustic transducers may be disposed in the acoustic assembly on the inboard side. In some implementations, the number of speakers on the inboard side may be different from the number of speakers on the outboard side. In some implementations, a combination of the above may also be used for obtaining target asymmetric radiation patterns.

Figure 5A:
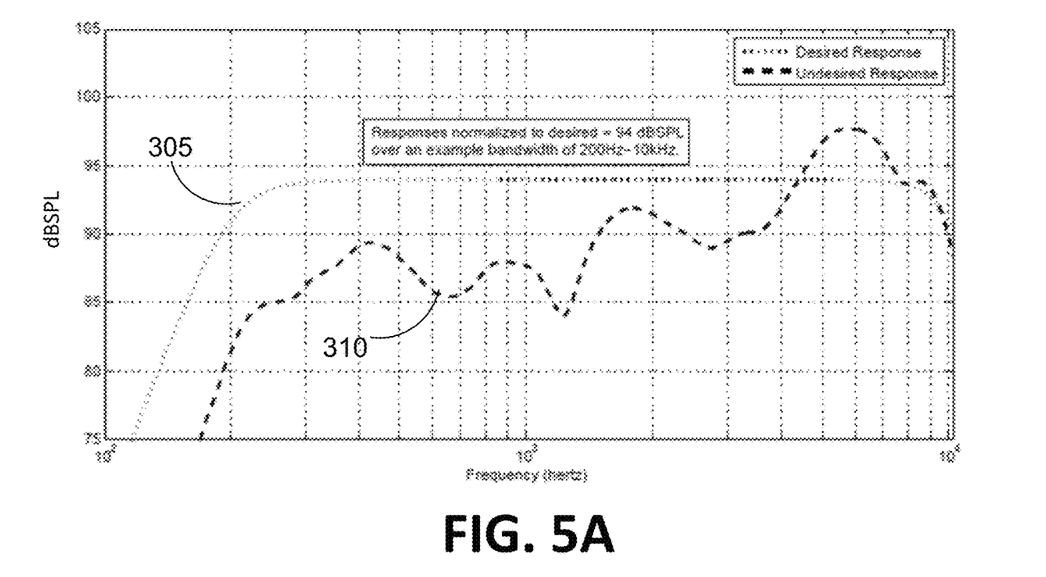
FIGS. 5A-5B show examples of speaker responses that illustrate the advantage of using the technology described herein.
Figure 5B:
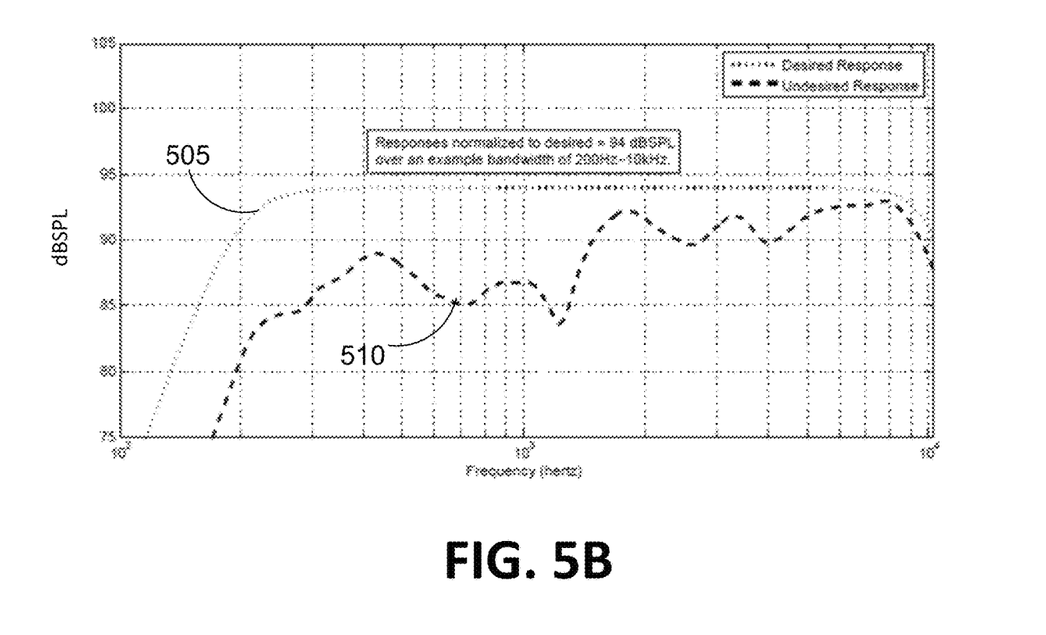

FIGS. 5A and 5B show examples of speaker responses that illustrate the advantage of using the technology described herein. Specifically, FIG. 5A is identical to the FIG. 3, which has been shown again for ease of comparison. FIG. 5B show the responses of the same speaker, except that a 3D-printed acoustic guide (substantially similar to the shaping portion 410) was inserted in the inboard acoustic channel. In FIG. 5B, the plot 505 represents the desired response, and the plot 510 represents the undesired response. Comparing FIGS. 5A and 5B, it can be seen that while the desired response 505 is substantially similar to the response 305, the undesired response 510 is reduced as compared to the response 310, particularly for frequencies 2 KHz and above, due to the introduction of the acoustic guide. This example, which shows reduction in the levels of the undesired response in the high frequency range, therefore illustrates how the subject technology may be used in improving inter-seat isolation.

Figure 6A:
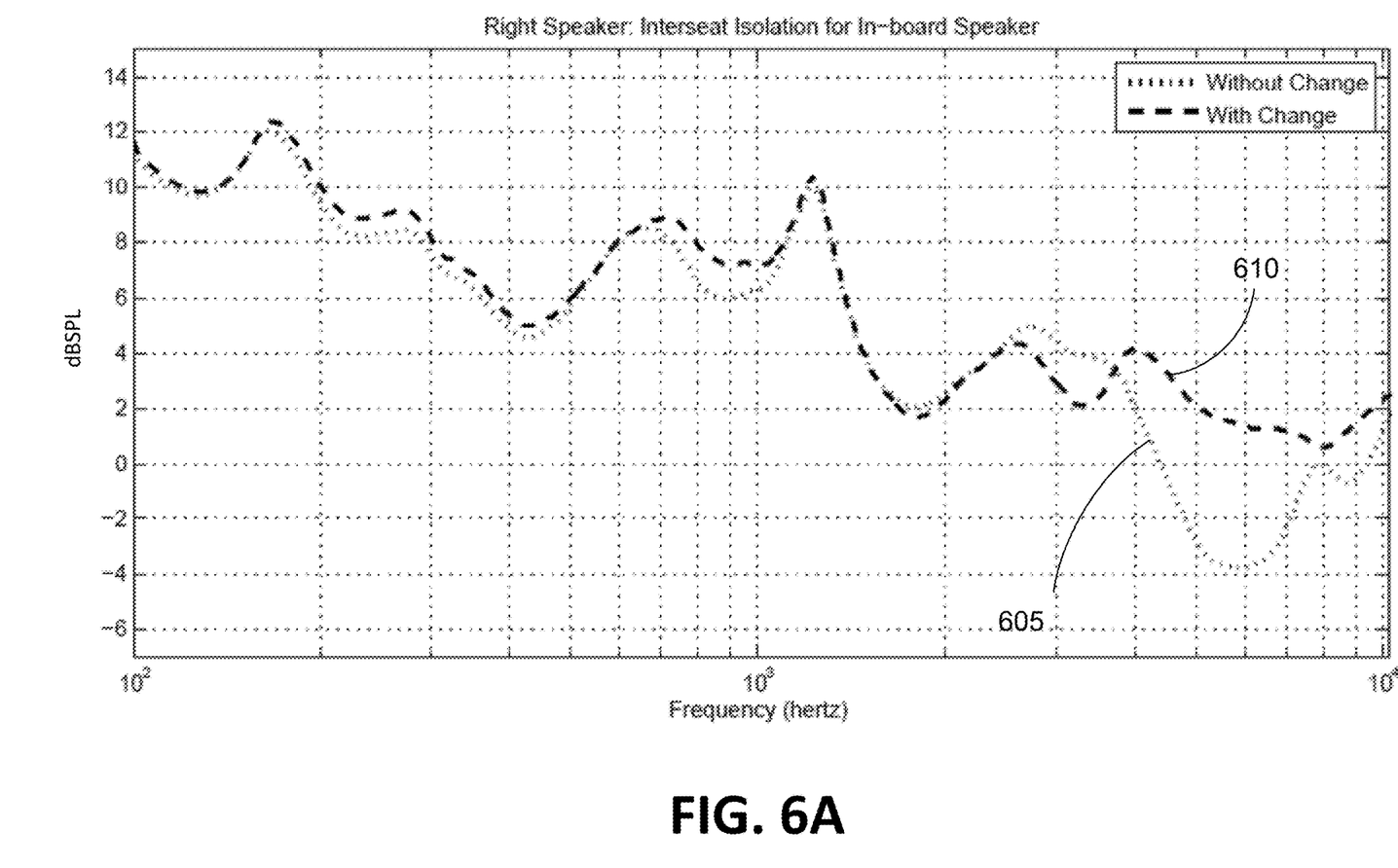
FIGS. 6A-6C show examples illustrating advantages of using asymmetric radiation patterns described herein.

The improvement in inter-seat isolation is specifically illustrated in FIG. 6A, which shows inter-seat isolation levels (in $dB_{SPL}$) with and without the acoustic guide inserted into the acoustic channel on the inboard side. Inter-seat isolation is defined here as the ratio between (i) energy at the desired listener's ear and (ii) energy at the in-board side ear of the listener at the other seat. The plot 605 shows the inter-seat isolation values as a function of frequency without the acoustic guide inserted, and the plot 610 shows the inter-seat isolation values with the acoustic guide. As seen in FIG. 6A, the inter-seat isolation was significantly improved in the frequency range 3 KHz and above.

Figure 6B:
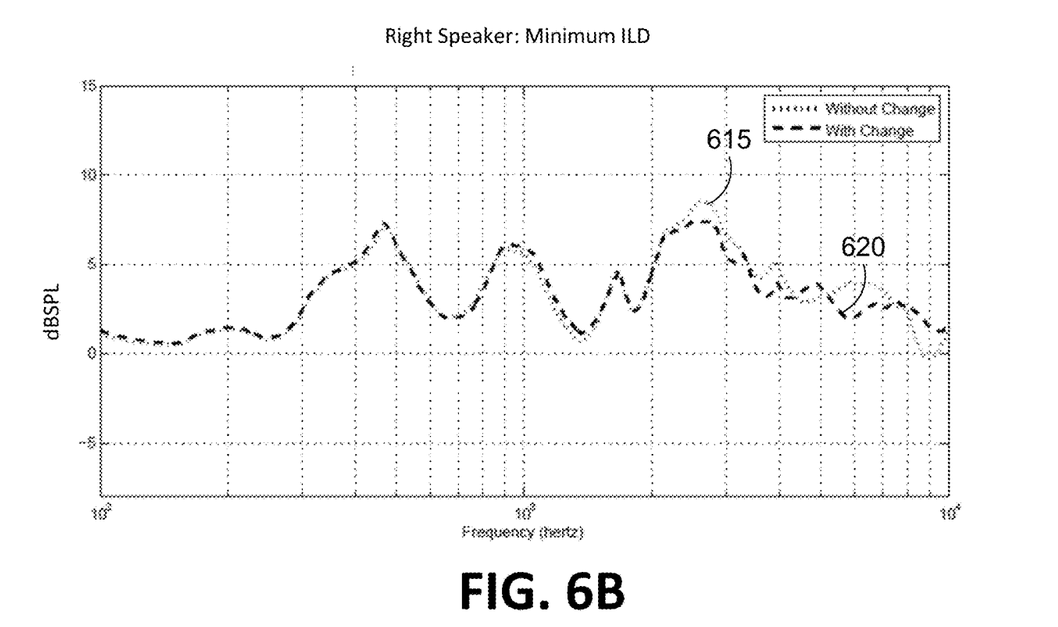
Figure 6C:
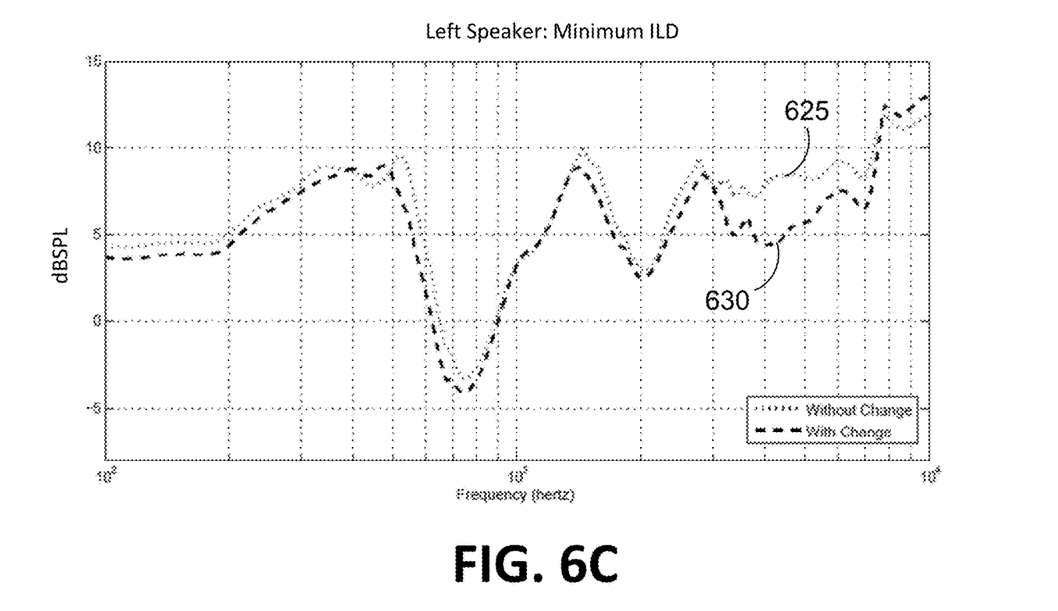

The asymmetric radiation pattern described herein may improve inter-seat isolation without significantly degrading (or in some cases, improving) the inter-aural characteristics that may be affected due to the two different radiation patterns emanating from the two sides of a headrest. FIGS. 6B and 6C illustrate the minimum ILD as functions of frequency, for the right acoustic assembly and the left acoustic assembly, respectively, with and without the acoustic guide inserted in the inboard acoustic channel. Specifically, FIG. 6B represents the right acoustic assembly, wherein the plot 615 represents the minimum ILD without the acoustic guide and the plot 620 represents the minimum ILD with the acoustic guide. FIG. 6C represents the left acoustic assembly, wherein the plot 625 represents the minimum ILD without the acoustic guide and the plot 630 represents the minimum ILD with the acoustic guide. From the particular examples shown in FIGS. 6B and 6C, it can be observed that the use of the acoustic guide on the in-board side acoustic assembly did not significantly degrade minimum ILD in any frequency range (FIG. 6B) whereas the use of the acoustic guide on the out-board side acoustic assembly degraded minimum ILD above around 3 KHz (FIG. 6C). Therefore, in some cases, the acoustic guide may be used in the acoustic assembly on one side (e.g., the in-board side) to generate an asymmetric radiation pattern.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A headrest for a vehicle-seat, the headrest comprising:
a first acoustic assembly including a first set of one or more acoustic transducers and a first acoustic channel disposed between the first set of one or more acoustic transducers and a first portion of the headrest, the first acoustic assembly configured to radiate acoustic energy from the first portion of the headrest in a first radiation pattern; and
a second acoustic assembly including a second set of one or more acoustic transducers and a second acoustic channel disposed between the second set of one or more acoustic transducers and a second portion of the headrest, the second acoustic assembly configured to radiate acoustic energy from the second portion of the headrest in a second radiation pattern,
wherein the second acoustic channel includes an acoustic guide configured to direct acoustic energy out of the second acoustic channel in accordance with the second radiation pattern that is substantially different from the first radiation pattern, and generate an asymmetric radiation pattern for the headrest, and
wherein the one or more acoustic transducers of the first acoustic assembly and the one or more acoustic transducers of the second acoustic assembly are oriented substantially symmetrically with respect to a center line of the headrest.

2. The headrest of claim 1, wherein the first portion of the headrest includes a first side of the headrest, and the second portion of the headrest includes another, substantially opposite second side of the headrest.

3. The headrest of claim 2, wherein the second portion of the headrest is closer to an adjacent location of a vehicle occupant as compared to the first portion of the headrest.

4. The headrest of claim 3, wherein the one or more acoustic transducers of the first acoustic assembly are oriented differently from the one or more acoustic transducers of the second acoustic assembly to generate the asymmetric radiation pattern.

5. The headrest of claim 1, wherein the acoustic guide is configured to be removably attached to the second acoustic channel.

6. The headrest of claim 1, wherein the second acoustic channel is configured such that acoustic energy radiated by the second set of one or more acoustic transducers is directed preferentially towards the front of the headrest.

7. The headrest of claim 1, wherein the first acoustic channel is configured such that acoustic energy radiated by the first set of one or more acoustic transducers is directed preferentially towards the side of the headrest.

8. The headrest of claim 1, wherein the second radiation pattern represents a target inter-seat distribution characteristic.

9. The headrest of claim 1, wherein the second radiation pattern represents a target inter-aural distribution characteristic.

10. A vehicle seat comprising:
a seat headrest configured to support the head of an occupant of the vehicle seat;
a first acoustic assembly disposed in the seat headrest and including a first set of one or more acoustic transducers and a first acoustic channel disposed between the first set of one or more acoustic transducers and a first portion of the seat headrest, the first acoustic assembly configured to radiate acoustic energy from the first portion of the headrest in a first radiation pattern; and
a second acoustic assembly disposed in the seat headrest and including a second set of one or more acoustic transducers and a second acoustic channel disposed between the second set of one or more acoustic transducers and a second portion of the headrest, the second acoustic assembly configured to radiate acoustic energy from the second portion of the headrest in a second radiation pattern, wherein the second acoustic channel includes an acoustic guide configured to direct acoustic energy out of the second acoustic channel in accordance with the second radiation pattern that is substantially different from the first radiation pattern, and generate an asymmetric radiation pattern, and wherein the one or more acoustic transducers of the first acoustic assembly and the one or more acoustic transducers of the second acoustic assembly are oriented substantially symmetrically with respect to a center line of the headrest.

11. The vehicle seat of claim 10, wherein the first portion of the headrest includes a first side of the headrest, and the second portion of the headrest includes another, substantially opposite second side of the headrest.

12. The vehicle seat of claim 11, wherein the second portion of the headrest is closer to an adjacent location of a vehicle occupant as compared to the first portion of the headrest.

13. The vehicle seat of claim 12, wherein the one or more acoustic transducers of the first acoustic assembly are oriented differently from the one or more acoustic transducers of the second acoustic assembly to generate the asymmetric radiation pattern.

14. The vehicle seat of claim 10, wherein the acoustic guide is configured to be removably attached to the second acoustic channel.

15. The vehicle seat of claim 10, wherein the second acoustic channel is configured such that acoustic energy radiated by the second set of one or more acoustic transducers is directed preferentially towards the front of the seat headrest.

16. The vehicle seat of claim 10, wherein the first acoustic channel is configured such that acoustic energy radiated by the first set of one or more acoustic transducers is directed preferentially towards the side of the seat headrest.

17. The vehicle seat of claim 10, wherein the second radiation pattern represents a target inter-seat distribution characteristic.

18. The vehicle seat of claim 10, wherein the second radiation pattern represents a target inter-aural distribution characteristic.

* * * * *